No. 838,968. PATENTED DEC. 18, 1906.
V. H. EMERSON.
SOUND RECORD AND SOUND RECORD TABLET.
APPLICATION FILED AUG. 19, 1905.

UNITED STATES PATENT OFFICE.

VICTOR H. EMERSON, OF NEW YORK, N. Y., ASSIGNOR TO AMERICAN GRAPHOPHONE COMPANY, OF BRIDGEPORT, CONNECTICUT, A CORPORATION OF WEST VIRGINIA.

SOUND-RECORD AND SOUND-RECORD TABLET.

No. 838,968.      Specification of Letters Patent.      Patented Dec. 18, 1906.

Application filed August 19, 1905. Serial No. 274,908.

*To all whom it may concern:*

Be it known that I, VICTOR H. EMERSON, a citizen of the United States, and a resident of New York city, New York, have invented a new and useful Sound-Record and Sound-Record Tablet, fully set forth in the following specification.

This invention relates to sound-records, and more particularly to a new sound-record tablet.

It has been proposed heretofore to make sound-record tablets of celluloid and also of compositions containing shellac. Each of these substances possesses certain properties which render them desirable as sound-record material, but there are also certain inherent objections to their use. Shellac is expensive, and the records heretofore made of shellac-containing compositions wear out rapidly and also act to quickly destroy the reproducing-stylus, such stylus requiring to be changed after each reproduction. When records are made of celluloid by impressing a matrix containing the sound-record in reverse, the celluloid does not take a clear and accurate impression, with the result that the record is more or less defective.

I have discovered that if shellac and crocus-powder or shellac alone be incorporated with the ordinary ingredients employed in making celluloid and the resulting composition employed as a sound-record tablet the objections heretofore existing to celluloid and to shellac are almost entirely eliminated, and a record of unusual quality is secured. This composition readily takes a clean-cut accurate impression from the matrix, producing a record of great durability and one which does not wear the reproducing-stylus to nearly the extent experienced with the old record, many reproductions being secured from the same stylus, and hence without the annoyance incident to a change of stylus at each reproduction. Moreover, the amount of shellac, and hence the incident expense, is greatly reduced.

In the production of celluloid guncotton is dissolved with camphor, the ingredients being ground and thoroughly mixed and the composition then treated in a manner well known to persons skilled in that art. According to my present invention I incorporate with the celluloid ingredients either shellac alone or shellac and crocus-powder, preferably during or in advance of the grinding and mixing of the celluloid ingredients, and then proceed in the usual manner of making celluloid.

The proportion of the various ingredients may of course be varied within limits; but the formula I have found to give the most satisfactory results consists of adding twenty per cent., (20%,) by weight, of shellac to the usual celluloid mixture and (when crocus-powder is to be used) ten per cent., (10%,) by weight, of crocus-powder. I preferably dissolve the shellac in any suitable solvent, as alcohol, and after incorporation with the celluloid mixture the whole mass is mixed and thoroughly ground, just as in the production of celluloid. If desired, any suitable pigment may be added, and in all other respects the usual method of making celluloid is followed.

My new composition is a normally hard body having many of the characteristics of celluloid, but differing therefrom in that it is harder and at the same time less yielding than celluloid. These properties make it much superior to celluloid as a material for sound-records, since it gives a harder and smoother surface for the reproducing-stylus, and it neither wears away the stylus nor is it worn by the stylus to the extent prevailing with record materials heretofore employed, particularly in what are known as the "zig-zag" form of records. In fact, a record made in a tablet of this new composition may be reproduced a great number of times without changing the stylus. Furthermore, since this material is less yielding than celluloid it does not "give" or yield laterally to the stylus, and hence produces a more accurate reproduction. This composition is formed into comparatively thin disks, and being hard and firm is capable of sustaining itself without the employment of any backing, though manifestly such backing may be used if desired. These disks then have sound-record grooves formed therein by impressing a matrix into their surfaces under heat and pressure, as in the ordinary way of making a record on a celluloid tablet.

While the proportions above set forth have been found to give excellent results, it will be understood that the invention is not limited to the exact percentages named, since the benefits of my discovery follow to a greater or less degree when any appreciable quantity of shellac or its equivalent is incorporated—namely, a substitute for celluloid which presents a surface in every way better than celluloid or shellac for sound-records.

For convenient reference a drawing showing conventionally a sound-record and bearing a legend indicating its composition accompanies this specification.

What is claimed is—

1. A tablet for sound-records, consisting of a hard and self-sustaining body containing shellac in addition to the ingredients of celluloid.

2. A sound-record tablet composed of a homogeneous body containing shellac and the ingredients of celluloid.

3. A sound-record tablet consisting of a self-sustaining body composed of shellac and the ingredients of celluloid.

4. A sound-record tablet consisting of a self-sustaining body composed of shellac, crocus-powder and the ingredients of celluloid.

5. A sound-record tablet consisting of a self-sustaining body composed of celluloid and shellac.

6. A sound-record consisting of a tablet composed of shellac and the ingredients of celluloid and having irregularities corresponding to sound-waves formed therein.

In testimony whereof I have signed this specification in the presence of two subscribing witnesses.

VICTOR H. EMERSON.

Witnesses:
 WILLIAM E. HILLS,
 W. H. HARTING.